US012077992B2

(12) United States Patent
Kao et al.

(10) Patent No.: US 12,077,992 B2
(45) Date of Patent: Sep. 3, 2024

(54) SECURITY ANCHOR FOR PORTABLE ELECTRONIC DEVICE

(71) Applicant: ACCO Brands Corporation, Lake Zurich, IL (US)

(72) Inventors: James Kao, Fremont, CA (US); William De Meulenaere, Newark, CA (US); Michael D. Otsuka, Sunnyvale, CA (US); Wilson S. Tse, Burnaby (CA)

(73) Assignee: ACCO Brands Corporation, Lake Zurich, IL (US)

( * ) Notice: Subject to any disclaimer, the term of this patent is extended or adjusted under 35 U.S.C. 154(b) by 337 days.

(21) Appl. No.: 17/491,657

(22) Filed: Oct. 1, 2021

(65) Prior Publication Data

US 2022/0170297 A1 Jun. 2, 2022

Related U.S. Application Data

(60) Provisional application No. 63/119,984, filed on Dec. 1, 2020.

(51) Int. Cl.
*E05B 73/00* (2006.01)

(52) U.S. Cl.
CPC ...... *E05B 73/0082* (2013.01); *E05B 73/0005* (2013.01)

(58) Field of Classification Search
CPC ... E05B 73/00; E05B 73/0005; E05B 73/0082
See application file for complete search history.

(56) References Cited

U.S. PATENT DOCUMENTS

| | | | | |
|---|---|---|---|---|
| 6,619,080 | B1 * | 9/2003 | Yu | E05B 73/0005 70/58 |
| 7,201,029 | B2 | 4/2007 | Murray, Jr. et al. | |
| 8,042,366 | B2 | 10/2011 | Mahaffey et al. | |
| 8,640,510 | B1 | 2/2014 | Derman | |
| 9,187,934 | B1 * | 11/2015 | Lee | E05B 73/0005 |
| 10,400,482 | B2 * | 9/2019 | Kao | E05B 73/0082 |
| 10,656,682 | B2 | 5/2020 | Hung et al. | |
| 10,808,431 | B2 * | 10/2020 | Su | E05B 73/0082 |
| 11,203,885 | B2 * | 12/2021 | Su | E05B 73/0082 |
| 2003/0106349 | A1 | 6/2003 | Broadbridge et al. | |
| 2008/0034816 | A1 * | 2/2008 | Lu | E05B 73/0082 70/58 |
| 2010/0180648 | A1 | 7/2010 | Knox | |
| 2011/0061427 | A1 * | 3/2011 | Mahaffey | E05B 73/0082 70/58 |
| 2015/0368932 | A1 | 12/2015 | Mahaffey et al. | |

(Continued)

*Primary Examiner* — Christopher J Boswell
(74) *Attorney, Agent, or Firm* — Michael Best & Friedrich LLP

(57) ABSTRACT

A security anchor for a portable electronic device having an opening includes a body configured to be engaged by a lock head of a lock, a first engagement element extending from the body and configured to be inserted into the opening of the portable electronic device, a second engagement element extending from the body and configured to be inserted into the opening of the portable electronic device, and a plunger positioned between the first engagement element and the second engagement element. The plunger is linearly slidable and subsequently rotated relative to the body to expand apart the first and second engagement elements.

20 Claims, 6 Drawing Sheets

(56) References Cited

U.S. PATENT DOCUMENTS

| | | | |
|---|---|---|---|
| 2019/0316385 A1 | 10/2019 | Tse et al. | |
| 2020/0080346 A1 | 3/2020 | Wu | |
| 2020/0173202 A1 | 6/2020 | Avganim | |
| 2023/0228129 A1* | 7/2023 | Wang | E05B 73/0082 70/58 |

* cited by examiner

FIG. 6A
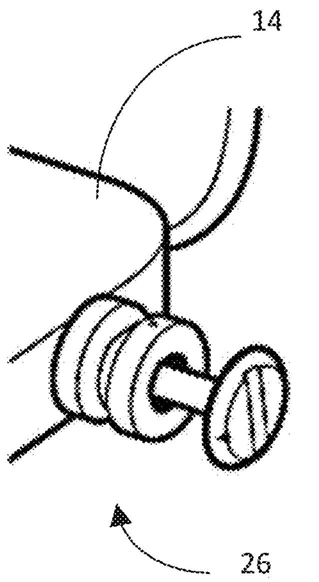
FIG. 6B
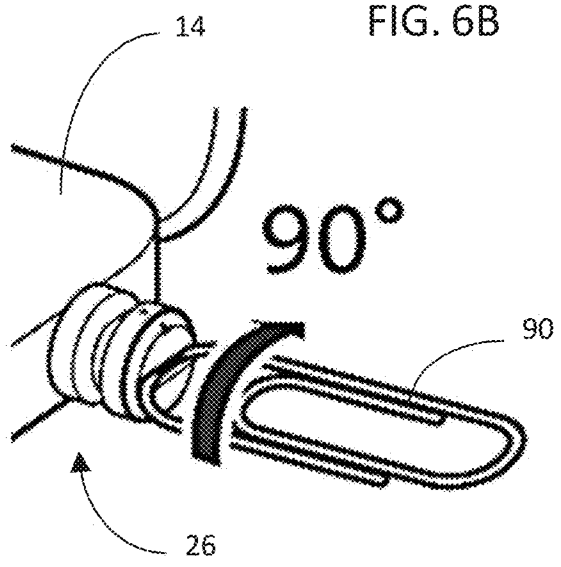
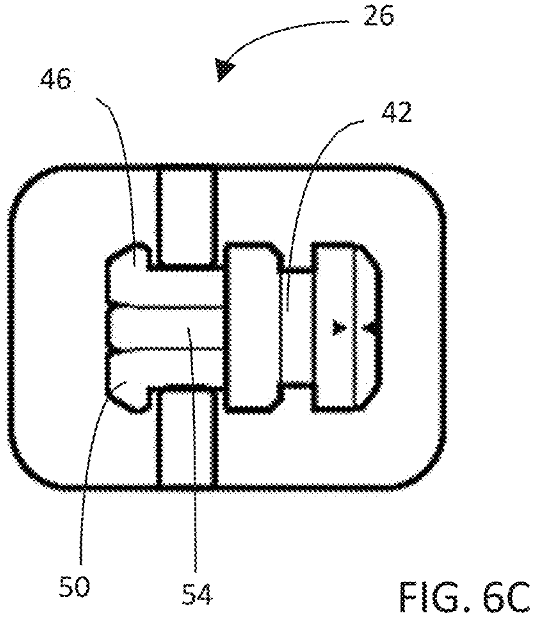
FIG. 6C

SECURITY ANCHOR FOR PORTABLE ELECTRONIC DEVICE

CROSS-REFERENCE TO RELATED APPLICATIONS

The present application claims benefit of U.S. Provisional Patent Application No. 63/119,984, filed Dec. 1, 2020, the entire contents of which are incorporated herein by reference.

FIELD OF THE INVENTION

The present invention relates to locks for portable electronic devices, such as laptop computers, tablet computers, and the like. More particularly, the present invention relates to security anchors for creating locking points on portable electronic devices.

SUMMARY

In one embodiment, the invention provides a security anchor for a portable electronic device having an opening. The security anchor includes a body configured to be engaged by a lock head of a lock, a first engagement element extending from the body and configured to be inserted into the opening of the portable electronic device, a second engagement element extending from the body and configured to be inserted into the opening of the portable electronic device, and a plunger positioned between the first engagement element and the second engagement element. The plunger is linearly slidable and subsequently rotated relative to the body to expand apart the first and second engagement elements.

In another embodiment, the invention provides a security anchor for a portable electronic device having an opening. The security anchor includes a body configured to be engaged by a lock head of a lock, a first engagement element extending from the body and configured to be inserted into the opening of the portable electronic device, a second engagement element extending from the body and configured to be inserted into the opening of the portable electronic device, and a plunger coupled to the body and movable between a first position, in which the first and second engagements are movable toward each other, a second position, in which the plunger is moved to spread apart the first and second engagement elements, and a third position, in which the plunger is moved to inhibit movement of the plunger back to the first position.

Other aspects of the invention will become apparent by consideration of the detailed description and accompanying drawings.

BRIEF DESCRIPTION OF THE DRAWINGS

FIG. 6A is a perspective view of the security anchor in the unlocked position and seated in the portable electronic device.

FIG. 6B is a perspective view of the security anchor with the plunger rotated and axially inserted to a locked position.

FIG. 6C is a side view of the security anchor in the locked position in the portable electronic device.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
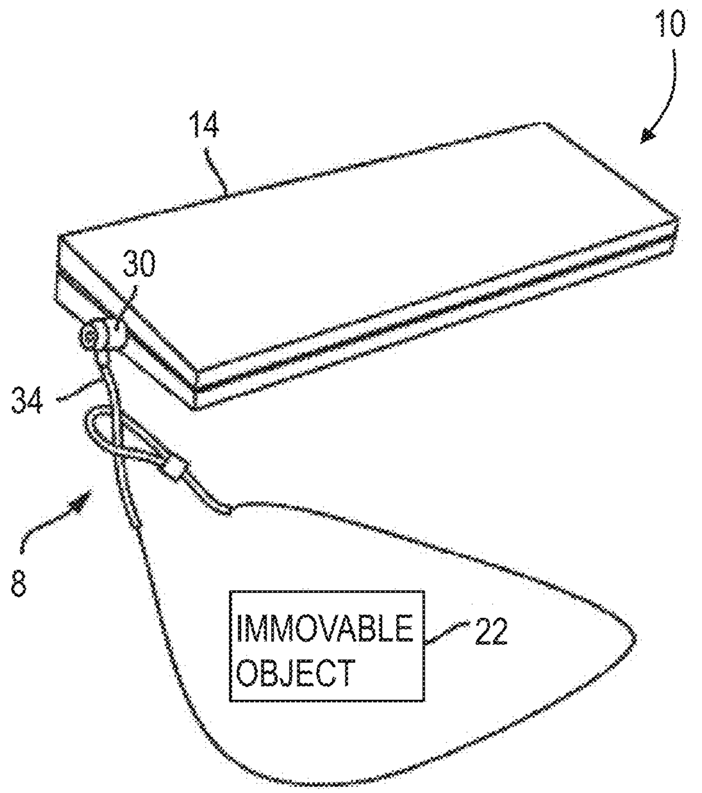
FIG. 1 is a perspective view of a system including a portable electronic device and a security apparatus securing the portable electronic device to an immovable object.

FIG. 1 illustrates a system 10 including a portable electronic device 14 and a security apparatus 18. The illustrated portable electronic device 14 is a laptop or notebook computer. In other embodiments, the portable electronic device 14 may be another type of device, such as a smartphone, a tablet computer, an eReader, a desktop computer, a docking station, a chip & pin reader, a USB hub, and the like.

Figure 5A:
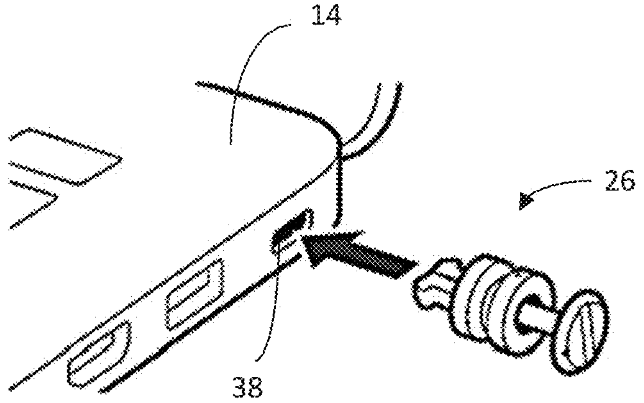
FIG. 5A is a perspective view of the security anchor being inserted into the portable electronic device in the unlocked position.
Figure 5B:
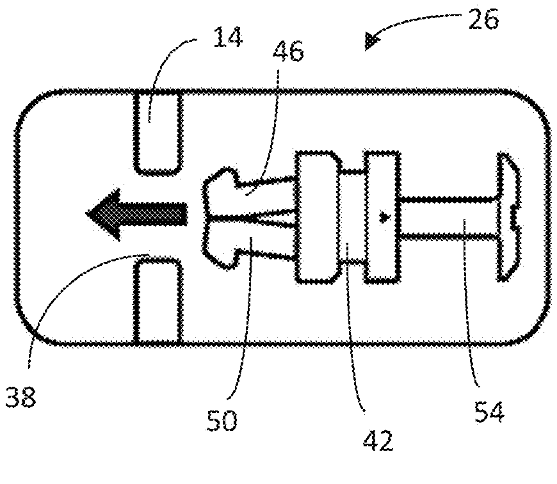
FIG. 5B is a side view of the security anchor being inserted into the portable electronic device in the unlocked position.

The security apparatus 18 attaches to the portable electronic device 14 to secure the device to a relatively immovable object 22. In the illustrated embodiment, the security apparatus 18 includes a security anchor or adapter 26 (FIGS. 2-3), a lock head 30, and cable 34. As explained below, the security anchor 26 is partially received in and attaches to an opening 38 (FIG. 5) in the portable electronic device 14. The lock head 30 attaches to a portion of the anchor 26 to secure the lock head 30 to the portable electronic device 14. The cable 34 is attached to the lock head 30 and wraps around, or otherwise engages, the immovable object 22 to secure the portable electronic device 14 in place. The immovable object 22 may be, for example, a desk, a chair, a bracket, or other relatively secure structure. In some embodiments, the lock head 30 and the cable 34 may be similar to the ClickSafe® lock sold by Kensington and disclosed in U.S. Publication No. 2015/0368932, the entire contents of which are incorporated by reference herein.

Figure 2:
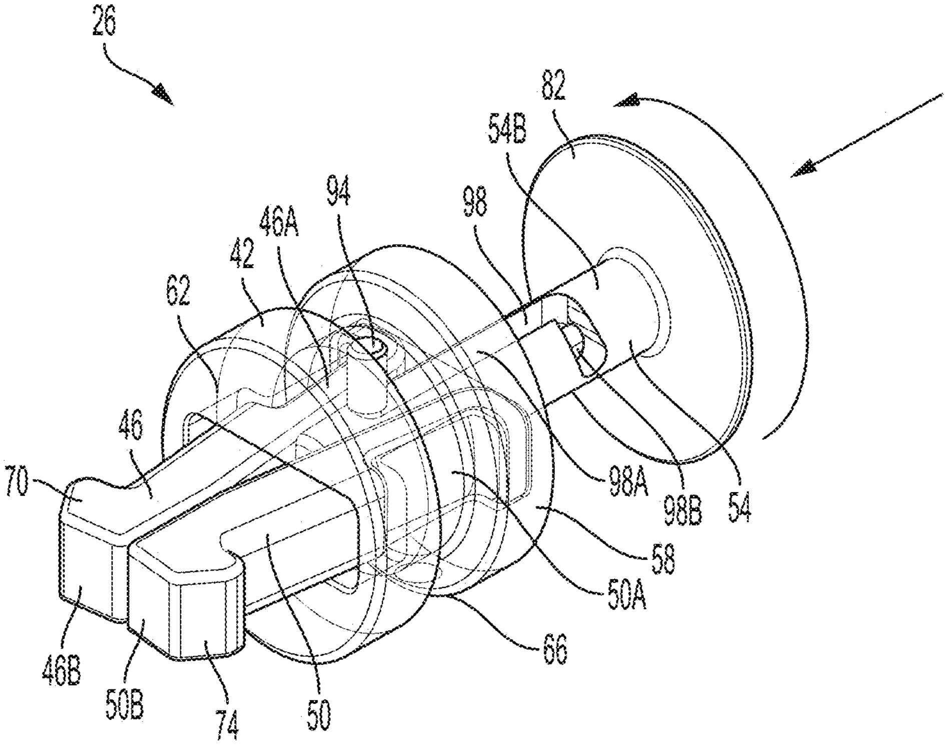
FIG. 2 is a perspective view of a security anchor of the security apparatus in an unlocked position.
Figure 3:
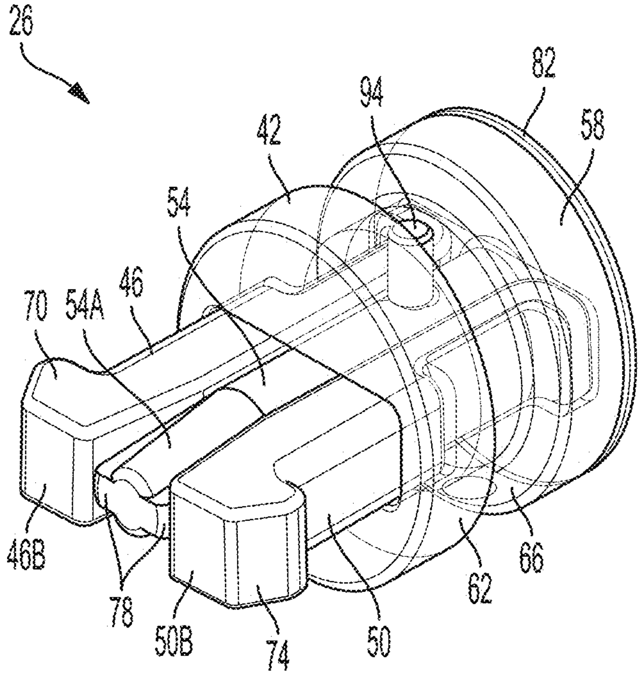
FIG. 3 is a perspective view of the security anchor in a locked position.

FIGS. 2 and 3 illustrate the security anchor 26 in more detail. The illustrated anchor 26 includes a body 42, a first engagement element 46, a second engagement element 50, and a plunger 54. The body 42 is generally cylindrical and includes an enlarged end or cap 58, a ring 62, and an annular recess 66 positioned between the cap 58 and the ring 62. The ring 62 is configured to be positioned adjacent or abut an outer surface of the portable electronic device 14 (FIG. 1) when the anchor 26 is attached to the device 14. The cap 58 and the annular recess 66 provide a locking point for the lock head 30 (FIG. 1).

The first engagement element 46 and the second engagement element 50 extend from the body 42. More particularly, the first and second engagement elements 46, 50 extend outwardly from the ring 62 of the body 42. Each engagement element 46, 50 includes a first end portion 46A, 50A positioned within the body 42 and a second end portion 46B, 50B positioned outside of the body 42. The second end portions 46B, 50B, or engagement ends, are configured to be inserted into the opening 38 (FIG. 5) of the portable electronic device 14. Each second end portion 46B, 50B includes a projection or hook 70, 74 that engages an inner surface of the portable electronic device 14 when the engagement elements 46, 50 are inserted into the opening 38 of the device 14.

The first and second engagement elements 46, 50, or fingers, are movable relative to the body 42. In the illustrated embodiment, the engagement elements 46, 50 are pivotable relative to the body 42. In other embodiments, the engagement elements 46, 50 may be linearly slidable relative to the body 42. The illustrated engagement elements 46, 50 are movable between a first or unlocked position (FIG. 2) and a second or locked position (FIG. 3). In the unlocked position, the engagement elements 46, 50 are movable toward each other. In this position, the engagement elements 46, 50 may be inserted into or removed from the opening 38 (FIG. 5) of the portable electronic device 14. In the locked position, the engagement elements 46, 50 are spread apart from each other. In this position, the engagement elements 46, 50 inhibit removal of the security anchor 26 from the portable electronic device 14. In some embodiments, the engagement elements 46, 50 may be biased (e.g., by a spring, an elastomeric or rubber element, etc.) to the unlocked position.

Figure 4A:
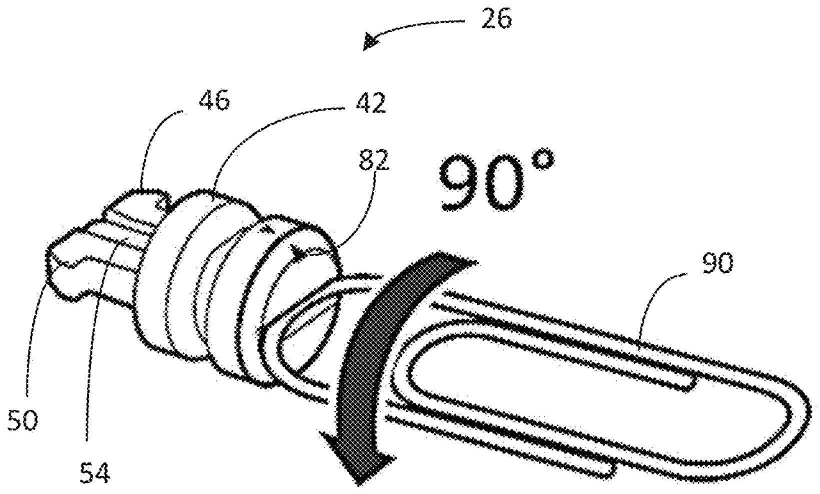
FIG. 4A is a perspective view of the security anchor engaged by a tool.
Figure 4B:
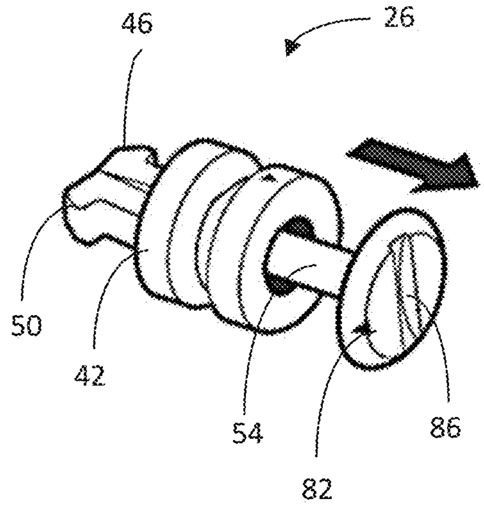
FIG. 4B is a perspective view of the security anchor transitioning a plunger of the security anchor from a forward engaged position to a rearward disengaged position.

The plunger 54, or paddle, also extends from the body 42. The plunger 54 extends from an opposite side of the body 42 than the first and second engagement elements 46, 50. More particularly, the plunger 54 extends from the cap 58. The plunger 54 includes a first end portion 54A positioned within the body 42 and a second end portion 54B positioned outside of the body 42. The first end portion 54A is generally tapered in a frustoconical shape, while the second end portion 54B is generally cylindrical. The first end portion 54A also includes two wings 78 that increase a diameter of the first end portion 54A. The wings 78 are located on diametrically opposite sides of the frustoconical shape. The illustrated plunger 54 also includes a head 82 at the second end portion 54B. In the illustrated embodiment, the head 82 is a disc having generally the same outer diameter as the cap 58 of the body 42. In other embodiments, the head 82 may have other configurations. The head 82 is configured to be engaged by a user to move the plunger 54 relative to the body 42 and the first and second engagement elements 46, 50. As shown in FIG. 4A, the illustrated head 82 defines a groove 86 that is configured to be engaged by a tool 90. The tool 90 may be, for example, a paperclip, a coin, a screwdriver, and the like. In other embodiments, the head 82 may define other types of openings or structures (e.g., a hex-shaped opening, one or more projections, a knurled surface, etc.) that facilitate engagement by a user and/or a tool.

Referring back to FIGS. 2 and 3, the plunger 54 is movable between a first position (FIG. 2) and a second position. In the illustrated embodiment, the plunger 54 linearly slides between the first and second positions. In the first position, the plunger 54 is moved away from the body 42 such that the first end portion 54A of the plunger 54 is positioned between the first end portions 46A, 50A of the engagement elements 46, 50. The second end portion 54B of the plunger 54 is extended out of the body 42. In this position, the engagement elements 46, 50 can move (e.g., pivot) together toward the unlocked position. In the second position, the plunger 54 is moved (e.g., linearly slid) into the body 42 such that the first end portion 54A of the plunger 54 is positioned between the second end portions 46B, 50B of the engagement elements. The second end portion 54B of the plunger 54 is received in the body 42 between the first end portions 46A, 50B of the engagement elements 46, 50. In this position, the engagement elements 46, 50 are moved (e.g., pivoted) away from each other toward the locked position. In some embodiments, the plunger 54 may be biased to the first position. For example, a coil spring may be wrapped around the second end portion 54B of the plunger 54 between the cap 58 of the body 42 and the head 82 of the plunger 54.

The plunger 54 is also movable to a third position (FIG. 3). In the third position, the plunger 54 is rotated to hold the plunger 54 in the second position. In the illustrated embodiment, the plunger 54 is rotated 90° (e.g., a quarter turn) from the second position to the third position. In other embodiments, the plunger 54 may be rotated a lesser or greater amount. When in the third position, the plunger 54 is inhibited from freely moving (e.g., linearly sliding) back toward the first position. In addition, when rotated to the third position, the wings 78 of the plunger 54 contact the engagement elements 46, 50 to push the engagement elements 46, 50 further apart.

In the illustrated embodiment, the body 42 includes a pin 94 and the plunger 54 defines a track 98 to guide or constrain movement of the plunger 54 between the first, second, and third positions. The track 98 is a groove formed in the plunger 54. The illustrated track 98 is generally L-shaped. The track 98 has a first portion 98A extending along a length of the plunger 54 (i.e., in the direction the plunger 54 moves between the first and second positions) and a second portion 98B extending circumferentially around the plunger 54 (i.e., in the direction the plunger 54 moves between the second and third positions). The second portion 98B is perpendicular to the first portion 98A. The pin 94 is received in the track 98. In the illustrated embodiment, the pin 94 is a separate element that is secured to the body 42. In other embodiments, the pin 94 may be a projection or other feature that is integrally formed with the body 42.

FIGS. 4A-6C illustrate the security anchor 26 in operation. As shown in FIGS. 4A-4B, the first and second engagement elements 46, 50 are first moved to the unlocked position by rotating the plunger 54 to the second position with the tool 90 (FIG. 4A) and sliding the plunger 54 to the first position (FIG. 4B). As shown in FIGS. 5A-5B, the first and second engagement elements 46, 50 are then inserted into the opening 38 of the portable electronic device 14 while in the unlocked position. As shown in FIGS. 6A-6C, the first and second engagement elements 46, 50 are then moved to the locked position by sliding the plunger 54 to the second position (i.e., pushing the plunger 54 toward the portable electronic device 14) and rotating the plunger 54 to the third position with the tool 90. As shown in FIG. 6C, in this position, the engagement elements 46, 50 engage the inner surface of the portable electronic device 14 adjacent the opening 38 to secure the anchor 26 to the portable electronic device 14. The lock head 30 (FIG. 1) may then be attached to the body 42 of the security anchor 26.

Figure 7A:
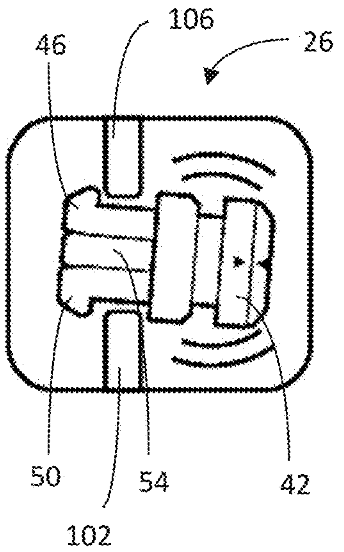
FIG. 7A is a side view of the security anchor relative to a portable electronic device having a thinner slot.
Figure 7B:
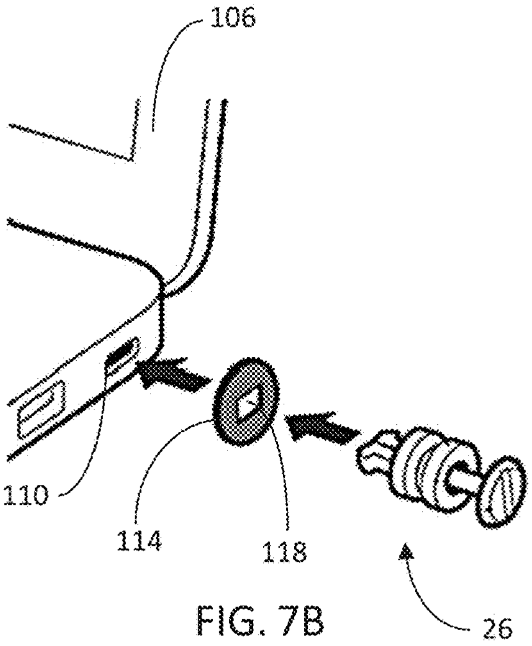
FIG. 7B is a partially exploded perspective view of the security anchor with a spacer.
Figure 7C:
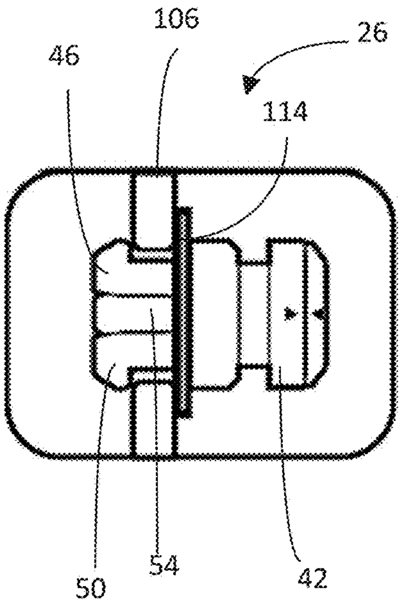
FIG. 7C illustrates the security anchor being attached to the portable electronic with the spacer.

FIGS. 7A-7C illustrate the security anchor 26 in another use scenario. In this scenario, a wall 102 of a portable electronic device 106 that defines an opening 110 may be relatively thin. As such, the anchor 26 may fit loosely and wobble when secured to the opening 110. The illustrated security anchor 26, therefore, also includes a spacer 114. The spacer 114 is positioned between the ring 62 of the anchor 26 and an outer surface of the portable electronic device 106. In the illustrated embodiment, the spacer 114 is a circular disc that defines an aperture 118. The aperture 118 is generally the same shape and size as the opening 110 in the portable electronic device 106 such that the first and second engagement elements 46, 50 can also extend through the aperture 118 in the spacer 114. In some embodiments, the spacer 114 may be made of a relatively rigid or hard material, such as plastic or metal. In other embodiments, the spacer 114 may be made of a relatively soft material, such as rubber, foam, or an elastomeric material.

Various features and advantages of the invention are set forth in the following claims.

What is claimed is:

1. A security anchor for a portable electronic device having an opening, the security anchor comprising:

a body configured to be engaged by a lock head of a lock;

a first engagement element extending from the body and configured to be inserted into the opening of the portable electronic device;

a second engagement element extending from the body and configured to be inserted into the opening of the portable electronic device; and a plunger positioned between the first engagement element and the second engagement element, the plunger being linearly slidable and subsequently rotated relative to the body to expand apart the first and second engagement elements.

2. The security anchor of claim 1, wherein the body includes a cap, a ring, and an annular recess positioned between the cap and the ring.

3. The security anchor of claim 1, wherein the first engagement element and the second engagement element are pivotable relative to the body.

4. The security anchor of claim 1, wherein the body includes a pin, and wherein the plunger defines a track that receives the pin to guide movement of the plunger relative to the body.

5. The security anchor of claim 4, wherein the plunger includes a first end portion and a second end portion, wherein the track extends axially from the first end portion toward the second end portion, and wherein the track extends circumferentially at the second end portion.

6. The security anchor of claim 5, wherein the plunger includes a head configured to be engaged by a user to move the plunger relative to the body at the second end portion.

7. The security anchor of claim 4, wherein the track is L-shaped.

8. The security anchor of claim 1, wherein the plunger includes a head configured to be engaged by a user to move the plunger relative to the body.

9. The security anchor of claim 8, wherein the head defines a groove configured to be engaged by a tool to rotate the plunger.

10. The security anchor of claim 8, wherein the head is a disc having an outer diameter sized similar to an outer diameter of the body.

11. The security anchor of claim 1, wherein the plunger is rotatable approximately 90°.

12. A security apparatus comprising:

the security anchor of claim 1; and the lock head selectively coupled to the body of the security anchor.

13. The security apparatus of claim 12, further comprising a cable coupled to the lock head and configured to engage an immovable object.

14. A security anchor for a portable electronic device having an opening, the security anchor comprising:

a body configured to be engaged by a lock head of a lock;

a first engagement element extending from the body and configured to be inserted into the opening of the portable electronic device;

a second engagement element extending from the body and configured to be inserted into the opening of the portable electronic device; and a plunger coupled to the body and movable between a first position, in which the first and second engagements are movable toward each other, a second position, in which the plunger is moved to spread apart the first and second engagement elements, and a third position, in which the plunger is moved to inhibit movement of the plunger back to the first position.

15. The security anchor of claim 14, wherein the plunger is linearly slid between the first position and the second position.

16. The security anchor of claim 14, wherein the plunger is rotated between the second position and the third position.

17. The security anchor of claim 14, wherein the plunger includes a head configured to be engaged by a user to move the plunger between the first position, the second position, and the third position.

18. The security anchor of claim 14, wherein a first end portion of the plunger has a frustoconical shape and includes a first wing and a second wing, the first and second wings located on diametrically opposite sides of the frustoconical shape to spread apart the first and second engagement elements in the second position.

19. A security apparatus comprising:

the security anchor of claim 14; and the lock head selectively coupled to the body of the security anchor.

20. The security apparatus of claim 19, further comprising a cable coupled to the lock head and configured to engage an immovable object.

* * * * *